United States Patent Office 3,564,596
Patented Feb. 16, 1971

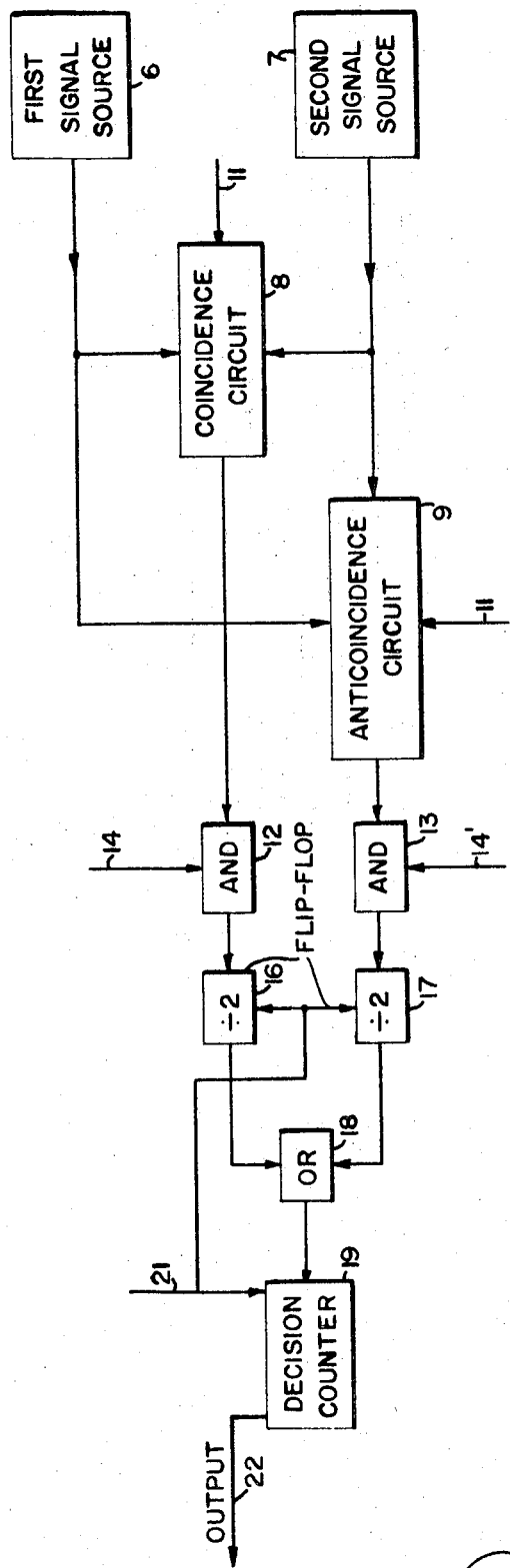

3,564,596
DECISION COUNTER
Cabell N. Pryor, Jr., Silver Spring, Md., assignor to the United States of America as represented by the Secretary of the Navy
Filed June 29, 1962, Ser. No. 206,529
Int. Cl. G06f 15/34
U.S. Cl. 235—181                                    6 Claims The invention described herein may be manufactured and used by or for the Government of the United States of America for governmental purposes without the payment of any royalties thereon or therefor.

This invention relates to a logical averaging circuit in which an inherent error of a decision producing circuit is made ineffectual by statistically varying the decision output between two limits over a period of time.

The present invention provides an improvement in the system described in copending application No. 206,526, filed June 29, 1962, titled "Automatic Rate Tracker" by John C. Munson and assigned to the assignee of the present application. That system describes an automatic tracker for following and indicating the time position of a signal peak in a regularly occurring signal cycle, such as a signal correlation function.

The present invention provides a new and improved decision counter circuit for use in the above application. In brief, the present invention relates to a system in which a plurality of signals are obtained by a plurality of transducers such as sound recorders. The signals received by the transducers are practically identical except that they are slightly displaced in time with respect to each other. An automatic target signal tracker system for following the output of such a system is described in copending application Ser. No. 127,068, filed July 26, 1961 by John C. Munson and assigned to the assignee of the present application. The above two applications by John C. Munson describe in detail an automatic tracking system for receiving the pulse signal output of a plurality of transducers and correlating the signals so that the optimum condition of correlation therebetween is automatically obtained and mantained by varying the signal received from one of the transducers in respect to the signals received by the other so that an alternating condition in which coincidence and anti-coincidence is sequentally obtained from the circuitry. The alternating condition of coincidence and anti-coincidence is utilized in deriving a decision to automatically correct the tracker system to obtain a continued condition of correlation between the plurality of signal sources. The present invention utilizes the coincidence and anti-coincidence pulses by summing, during a selective time period, the quantity of pulses and producing an output pulse if the sum is greater than a variable predetermined value and producing no output pulse when the sum is less than a predetermined value and producing randomly an output pulse and no output pulse when the sum of coincidence and anti-coincidence pulses is equal to the variable predetermined value based upon the determination whether the predetermined sum is obtained by adding an even number or odd number of signals.

The present invention relates to the condition in which a predetermined summation of coincidence and anti-coincidence pulses is received by the decision counter and the output produced by the present invention seeks to statistically alternate over a period of time to eliminate the over correction of the prior system by alternately producing one correction signal for one condition and a no correction signal for the other condition.

An object of the present invention is to statistically vary the output correction pulse occurring at the same critical conditions between two possibilities by dividing the conditions necessary to produce the correction pulse into two different sets of criteria.

A further object of the present invention is to eliminate the over correction in the one direction which occurs whenever the sum of the coincidence pulses and the anti-coincidence pulses satisfies the critical conditions.

Various other objects and advantages will be apparent from the following description of an illustrative embodiment of the invention, and the most novel features thereof will be particularly pointed out hereinafter in connection with the appended claims.

In the accompanying drawing the single figure illustrates in block diagram form an example of the present invention.

In the illustrative embodiment shown in the drawing the first signal source 6 and the second signal source 7 are preferably sound transducers which are spaced a known distance apart and are receiving sound signals from a moving target in the distance. Due to the Doppler effect the frequency of the sound, received by the two signal sources as the target moves past the transducers, increases as the target approaches the signal sources and decreases once it has passed. The signal from the first signal source 6, since it is spaced at a distance from the second signal source 7, will reach its peak of maximum compression or highest frequency and will be decreasing in frequency as the signal from the second signal source is approaching its peak of maximum frequency. The first and second signal sources include a correlating network within them, an example of which is shown in U.S. Pat. No. 2,958,039 issued to V. C. Anderson on Oct. 25, 1960. This electrical correlation network within the two signal sources corrects for the distance between the two signal sources so that the output from the transducers, converted into electrical impulses, is sampled as though they were transmitted therefrom simultaneously and as though the two signal sources were not separated by a known distance. The outputs of the two signal sources appears as an electrical pulse output which is proportional to the sound acoustic input and since the two transducers have received sound from the same target source, the outputs therefrom are nearly identical, so that in the time relationship the pulses are varying in frequency and start with a lower frequency and increase to a higher frequency, which is known as a peak, and then once again return to the lower frequency as the target moves past the transducers. The coincidence circuit 8 compares the input of each of the signal sources, 6 and 7 respectively, each time a clock pulse on lead 11 energizes a coincidence circuit to produce an output pulse upon coincidence and no pulse output upon noncoincidence. In a similar manner the anti-coincidence circuit 9 has a pair of inputs connected to each of the first and second signal sources as well as a clock pulse input on lead 11 which triggers the anti-coincidence circuit to compare the two signal inputs and produce a pulse output upon signal non-coincidence and no pulse upon signal coincidence. The same clock pulse source supplies the activation pulses to both the coincidence and the anti-coincidence circuits so that both circuits compare the input at the same instant and, as a result, an output is produced from one of the circuits but not from the other depending on the comparison results. The output from the coincidence circuit 8 is connected to the first AND gate 12 which passes pulses received from the coincidence circuit whenever the gate is enabled by a pulse of the proper polarity on the enabling pulse input 14. In a similar manner the second AND gate 13 is enabled during a second period of time by a proper pulse on the enabling pulse input 14' to pass the pulses from the anti-coincidence circuit. The output from the first and second AND gate 12 and 13 respectively, leads to a first and second divide-by-two circuit 16 and 17 respectively, which produces an output pulse upon the occurrence of every second input pulse applied thereto. In addition to the pulse input to the divide-by-two circuits there is a common reset connection to both circuits to initially set the divide-by-two circuitry in a first state or condition to initiate operation of the circuitry so that upon the occurrence of the second pulse a first output pulse will be produced. Suitable circuitry which will perform the divide-by-two function is the common flip-flop, which is well known in the art. The outputs from both the first and second divide-by-two circuits lead to an OR gate 18 which produces an output pulse upon the occurrence of an input pulse from either one of the divide-by-two circuits in a conventional manner. The pulses after passing through the OR circuit 18 serve as an input pulse to the decision counter 19 which is a standard multi-stage binary type of counter which increases its count by one upon the occurrence of every input pulse applied thereto. The decision counter is also connected to a reset terminal 21 so that in the beginning of a cycle of operation the decision counter is cleared at the same time that the divide-by-two circuits are placed in a predetermined initial state or condition. The decision counter has an output 22 of the overflow type such that, upon the complete filling of all the stages of the counter, the next succeeding pulse will produce a pulse on the output 22. The output 22 can conveniently be of the type which is settable or movable to different states thereby effecting a selection of the capacity of the counter so that, by eliminating one state, the capacity of the counter is reduced in half. Such a counter is shown and described in the aforementioned copending application of John C. Munson Ser. No. 206,526.

In operation the first AND gate 12 is enabled for a first period of time by a proper pulse on the input 14 to allow the counter to register or count every second or alternate coincidence pulse originating during this first period of time. Following the first period of time, either immediately or a short time later, a second period of time during which the second AND gate 13 is enabled by a proper pulse on the enabling pulse input 14' during which time the decision counter counts every second anti-coincidence circuit output pulse. If during the first and second period of time the sum total of the pulses arriving at the decision counter 19 is insufficient to fill the counter no output pulse will appear on the terminal to which the output 22 is connected, thus indicating to the system that the summation of the coincidence and anti-coincidence pulses is insufficient to fill the counter and thereby this will effectuate a command to the circuitry of the system, as described in the aforementioned copending application of John C. Munson, Ser. No. 206,526, to make a correction in one direction on the system as a whole. If during the same first and second periods of time the sum total of the pulse output counted by the decision counter from the coincidence circuit 8 and the anti-coincidence circuit 9 is sufficient to completely fill the decision counter 19, a pulse output will appear on the output terminal to which lead 22 is connected thereby indicating that a correction in the other direction is necessary. The critical point occurs when the sum of the coincidence circuit output and the anti-coincidence circuit output during the first period and second period of time equals the capacity of the decision counter as determined by output 22. Under these conditions in the prior system an output pulse would appear on lead 22 to thereby cause a correction factor in the other direction. The divide-by-two circuits 16 and 17 inserted after both the first and second AND gates, 12 and 13 respectively, eliminate this source of error which occurs when the sum total of the pulses appearing during the first and second periods of time equals the total capacity of the decision counter 19. Under these conditions it is desired that the decision counter randomly vary over a span of time the output between a correction and a no-correction output. In view of the fact that the first signal source and the second signal source are almost identical, this condition of equality in which the sum total of the output pulses just equals the capacity of the decision counter occurs quite frequently.

If it is assumed, by way of example, that A indicates the input to the first divide-by-two circuit 16 and B' indicates the input to the second divide-by-two circuit 17, then $A+B'=T$ then in all cases in which $A+B'<T$ there will be no output from the decision counter on output line 22 and in all cases in which $A+B'>T$ there will be an output pulse on output line 22. In the special case in which $A+B'=T$ it is desirable that the output on output line 22 vary between the condition of an output pulse and no output pulse. With these assumptions, the capacity of the counter 19 then will be $T/2$ and since the capacity of the counter is always a whole number T then will always be an even number so that $A+B'=T$ will always equal an even number. Since T is an even number this means that A and B' are both either even or odd, in other words, one cannot be even and and the other one odd at the same time. The output from the first divide-by-two circuit 16 will be $A/2$ when A is even and from the second divided-by-two circuit 17 the output will be $B'/2$ such that the total output of the two circuits will be $$\frac{A+B'}{2}=\frac{T}{2}$$

which will completely fill the counter 19 so that an output is produced. In the condition in which A is odd, the output from the first divide-by-two circuit 16 will be $$\frac{A-1}{2}$$

and if B' is also odd the output from the second divide-by-two circuit 17 will be $$\frac{B'-1}{2}$$

in which the sum is equal to $$\frac{(A-1)}{2}+\frac{(B'-1)}{2}$$

which is equal to $$\frac{A+B'-2}{2}$$

which is not equal to $T/2$ and therefore the counter will not be full and no output will appear on output lead 22. The probability of A and B' being equally odd or even over a span of time is approximately statistically equal thereby eliminating a source of error through the conditions in which $A+B'=T$.

It should be understood, of course that the foregoing disclosure relates to only an illustrative embodiment of the invention and that numerous modifications or alterations may be made therein without departing from the sphere and the scope of the invention as set forth in the appended claims.

What is claimed is:

1. Logical circuitry comprising a first AND and a second AND circuit operable seriatim for receiving and passing therethrough pulses during a first period of time and a separate and distinct second period of time respectively, a first and a second divide-by-two circuit connected to said first and second AND circuits respectively for receiving the pulses passed by said first and second AND circuits and each producing an output pulse upon the receipt of every second input pulse received, and a counter means connected to both said first and second divide-by-two circuits for counting all pulses produced thereby and producing an output pulse whenever the count in the counter means equals or exceeds the counting capacity thereof.

2. Logical circuitry comprising a first AND and a second AND circuit operable for passing therethrough received pulses during a first period of time and a second period of time respectively, a first and a second divideby-two circuit connected to said first and second AND circuits respectively for receiving the pulses passed by said first and second AND circuits and producing an output pulse upon the receipt of every second input pulse, and counter means connected to both said first and second divide-by-two circuits for counting the pulses passed by said first and second divide-by-two circuits and producing an output pulse whenever the sum of the pulses received by said first and second divide-by-two circuits is greater than twice the capacity of the counter means or equal to twice the capacity of the counter means and obtained by summing an even number of pulses from said first divide-by-two circuit and an even number of pulses from said second divide-by-two circuit.

3. A logical decision circuit comprising a first and a second AND gate each having an input for receiving pulses, an output terminal and an enabling means for passing the input pulses to the output terminal during a first and a second period of time respectively; a first and a second resettable divide-by-two circuit each having an input terminal connected to a different one of the said first and second AND gates for receiving the passed pulses, an output terminal for passing every second received pulse, and a reset terminal for setting the first and second divide-by-two circuits in an initial condition for passing every second pulse received; a multi-stage resettable decision counter means connected to both of said first and second divide-by-two circuits for counting all pulses passed by said last-named circuits and producing an output pulse whenever the sum of pulses received by both of said first and second divide-by-two circuits is greater than twice the counting capacity of the decision counter, and producing no output pulse whenever the total sum of pulses received by said first and second divide-by-two circuits is less than twice the counting capacity of decision counter, and producing an output pulse whenever the sum of pulses received by said first and second divide-by-two circuits is equal to twice the counting capacity of the counter means and obtained by summing an even number of pulses to said first divide-by-two circuit and an even number of pulses to said second divide by-two circuit, and producing no output pulse whenever the sum of pulses received by said first and second divide-by-two circuits is equal to twice the counting capacity of the counter means and obtained by summing an odd number of pulses to said first divide-by-two circuit and an odd number of pulses to said second divide-by-two circuit; and reset means for setting said, first and second divide-by-two circuits and said decision counter in an initial condition at the beginning of a cycle of operation.

4. An apparatus according to claim 3 further comprising an OR gate having an input connected to each of said first and second divide-by-two circuits for receiving pulses passed thereby and an output connected to said decision counter for passing thereto pulses received from said first and second divide-by-two circuits.

5. An apparatus according to claim 4 wherein each of said first and second divide-by-two circuits is a flip-flop circuit.

6. An apparatus according to claim 5 further comprising a first signal source and a second signal source, a coincidence and an anti-coincidence circuit each having an input from each of said first and second signal sources for comparing outputs received from said first and second signal sources, an output from said coincidence circuit connected to the input of said first AND circuit and an output from said anti-coincidence circuit connected to the input of said second AND circuit for passing a pulse arising in the coincidence and anti-coincidence circuits from the comparison of the outputs received from said first and second signal sources.

References Cited
UNITED STATES PATENTS

| | | | |
|---|---|---|---|
| 2,949,603 | 8/1960 | Logue | 343—8 |
| 3,007,115 | 10/1970 | Battey | 328—92 |
| 3,023,373 | 2/1962 | Naylor | 328—92 |

RODNEY D. BENNETT, JR., Primary Examiner

D. C. KAUFMAN, Assistant Examiner

U.S. Cl. X.R.

328—92